United States Patent [19]
Wolfe

[11] Patent Number: 5,588,661
[45] Date of Patent: Dec. 31, 1996

[54] WHEEL MOUNTING BRACKET AND SPACER

[76] Inventor: Robert M. Wolfe, 24042 Sprig St., Mission Viejo, Calif. 92691

[21] Appl. No.: 370,899

[22] Filed: Jan. 10, 1995

[51] Int. Cl.$^6$ ..................................................... B62J 11/00
[52] U.S. Cl. ................... 280/202; 280/288.4; 280/304.5; 211/20; 211/24
[58] Field of Search ............................... 280/202, 288.4, 280/304.5, 293, 304; 211/17, 20, 23, 24

[56] References Cited

U.S. PATENT DOCUMENTS

| | | | |
|---|---|---|---|
| 3,854,753 | 12/1974 | Hautier | 280/236 |
| 4,326,729 | 4/1982 | Luckowski | 280/304 |
| 4,762,255 | 8/1988 | Dunn | 280/304.5 X |
| 5,269,446 | 12/1993 | Biehn | 224/42.03 |
| 5,305,710 | 4/1994 | Ward, Jr. | 280/304.5 X |
| 5,407,222 | 4/1995 | Harrison | 280/304.5 X |

*Primary Examiner*—Margaret A. Focarino
*Assistant Examiner*—F. Zeender
*Attorney, Agent, or Firm*—Patent Law & Venture Group; Gene Scott

[57] ABSTRACT

A support bracket for mounting a first wheel onto a second wheel in side-by-side, parallel alignment. The bracket includes a mounting hole for engaging with and securing the bracket to a tightening bolt of a wheel axle assembly of the second wheel, a positioning slot for securing the bracket in place, and an open mounting slot through which a wheel axle of the first wheel is engaged and tightened. One embodiment includes a spacer that can be positioned on the opposite side of the first wheel axle so as to take up thread slack and utilize the clamping action of the first wheel tightening bolt for mounting the wheel.

9 Claims, 6 Drawing Sheets

WHEEL MOUNTING BRACKET AND SPACER

FIELD OF THE INVENTION

This invention relates generally to mounting brackets and more particularly to a bracket that can be attached to the rear wheel axle assembly of a bicycle in order to allow the front wheel to be easily mounted to it for convenient storage of the from wheel during the transport of the bicycle.

BACKGROUND OF THE INVENTION

Over the years bicycling has increasingly gained popularity as a sport, exercise and leisure activity. Accordingly, bicycles are often transported with cars, trucks and RVs so as to be ridden while on vacation, at racing events or on remote trails or the like. Thus, a wide variety of bicycle carrying racks are commercially available to allow bikes to be conveniently transported by motor vehicle. Typically, these racks are secured to the vehicle's roof or rear bumper, and can hold between one and four bicycles. Many racks are designed to hold the rear wheel and front fork of the bike, thus requiring that the front wheel be removed before it can be properly secured to the rack. An example of one such carrier is disclosed in U.S. Pat. No. 5,269,446 issued to Biehn in 1993. While these racks provide more stable, secure protection for the bicycle during transport, this form of carrier raises the problem of where, or how to store the front wheel. Generally, the front wheel can be stored in the vehicle's trunk, in an empty seat, or under a seat if room permits, but when the vehicle is filled to capacity storage of the tire can pose an unsolved problem. Proper storage is especially a problem when transporting two or more bicycles, in which case front wheels may become mixed together and later put on the wrong bicycle.

Thus, there is a need for a means to easily secure a front wheel of a bicycle to the bicycle itself, the most secure, convenient point of attachment being the rear wheel axle. There is no prior art that addresses these needs, although U.S. Pat. No. 4,326,729 issued to Luckowski et al. in 1982 discloses a bracket that mounts a secondary wheel onto the rear axle of a bicycle. However, as detailed in the reference, this invention is designed specifically to mount a training wheel to the rear axle, and includes no means by which to accommodate a larger front wheel, or to allow the attached wheel to be easily and frequently removed and replaced.

U.S. Pat. No. 3,854,753 issued to Hautier in 1974 discloses a small bracket to be fixed on the frame of a bicycle. The bracket has a slotted opening with peripheral abutment appendages, the slotted opening being designed to accept various gear-changers within it. While this effectively attaches a gear changer to the rear frame of the bicycle, the device is not designed or equipped to mount the front wheel.

The present invention fulfills these needs and provides further related advantages as described in the following summary.

SUMMARY OF THE INVENTION

The present invention, in its preferred mode, is a small bracket that is useful in mounting two wheels in side-by-side parallel alignment. The invention is particularly designed for use with bicycle wheels, although it is not limited to such use. The bracket can be permanently attached to a front or rear wheel axle assembly of a bicycle in order to allow another wheel to be mounted to it. Thus, the invention is especially beneficial for use in conjunction with bicycle carrying racks that require the front wheel be removed in order to properly transport the bike. The invention also provides an efficient, useful way to transport a spare wheel while riding the bike, as the bracket allows a third wheel to be easily mounted to the bicycle without inhibiting the movement of the bicycle. Thus, it is a primary object of the invention to provide a convenient means for efficiently storing the front wheel while transporting the bike.

The bracket is of a shape and size small enough to remain permanently attached to the bicycle without hindering bicycle operation in any way. This significantly reduces the work required each time a wheel is to be mounted onto another. Thus, it is an object of the present invention to provide a bracket that remains permanently attached to the bicycle, if desired, so that the wheel attachment process is both simple and quick and can be readily performed without any extraordinary strength or skill.

The bracket is a small, roughly planar metal piece with preferably three openings: a circular mounting hole, an elongated positioning slot and an open, U-shaped mounting slot. Both the mounting hole and the positioning slot are counterbored on a front side of the bracket. The mounting hole fits over a tightening bolt of a wheel axle assembly and a tightening nut secures the bracket to the axle assembly, the nut firmly engaging in the counterbore of the mounting hole. The positioning slot is located above the mounting hole, and is designed to permanently secure the bracket to the bicycle frame and to prevent the bracket from rotating around the tightening bolt. This is preferably accomplished by means of a button head hex bolt that fits through the positioning slot and threads into a mounting hole typically found in a mounting fork of the bicycle. The elongate shape of the positioning slot allows for adaptation to variations between bicycle frames. Thus, it is an object of the invention to be easily secured to all different types of bicycles, and not to rotate while mounted.

The invention is designed to work best with a most common type of wheel-to-fork tightening scheme used on a wide range of bicycles today. In this scheme, both bicycle wheels have an axle which extends through a wheel hub, and protrudes to either side of the hub. The axle is hollow and receives a threaded rod, referred to here as a wheel tightening bolt. The bolt extends from both sides of the axle for receiving a tightening nut. The tightening nut on the right side of the wheel is usually plain, while the nut on the left side of the wheel typically includes a clamping lever. When the fork is placed onto the axle on either side of the hub, the two tightening nuts are each turned onto the tightening bolt until they compress the fork onto a bearing set within the hub, and the clamping lever is rotated so as to cinch the nuts quite tightly. With this compressive force the wheel is safely mounted to the fork and yet can rotate freely on the bearing set, one on each side of the wheel. When one of the wheels is to be removed from its fork, the corresponding tightening nuts are rotated, leaving a space between each of them and the wheel hub, where the fork was previously positioned.

Thus, with bicycles using this type of wheel-to-fork tightening scheme, once the bracket is secured onto an axle assembly and the wheel to be mounted is disengaged from its fork, the side of the wheel's axle opposite the clamping lever is simply slid into the U-shaped mounting slot, so that the space between the plain nut and the hub engage with the bracket's mounting slot. On the other side of the axle, the nut with the clamping lever is then rotated and clamped into position, thereby cinching the entire assembly. Please note that the bracket fills the space usually occupied by one side of the frame fork. This effectively secures the wheel to the other wheel axle assembly of the bicycle, the two wheels being in side-by-side alignment.

The optional spacer is designed to fill the space on the axle usually occupied by the other side of the frame fork. The spacer thus helps speed the tightening process and preserve the nut with the clamping lever. The spacer is an inventive new addition to this type of mounting, as it allows the user to clamp the wheel to the bracket with fewer turns of the wheel tightening nut. The spacer is a small, triangular clamp that is clipped to the outside of the mounted wheel axle to fill the space usually occupied by the other side of the fork half, thereby taking up thread slack on the axle tightening bolt.

In this way, if the bracket is permanently attached to the bicycle, the entire mounting process requires only that a wheel be transferred from its fork onto the mounting bracket, the spacer be clipped in place on the wheel axle, the nut be tightened one or two turns and the nut's lever rotated to clamp the assembly in place.

Without the spacer, tightening the nut with the clamping lever directly against the axle does not provide adequate compressive force on the wheel hub, will crush a small conical spring which is often used in such assemblies and will damage the nut itself since the tightening mechanism will be overstressed. However, with the spacer in place, the force is transferred through the spacer to the wheel hub resulting in a properly tightened wheel axle assembly.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate a preferred mode of the present invention. In such drawings.

DETAILED DESCRIPTION OF THE PREFERRED EMBODIMENT

Figure 1:
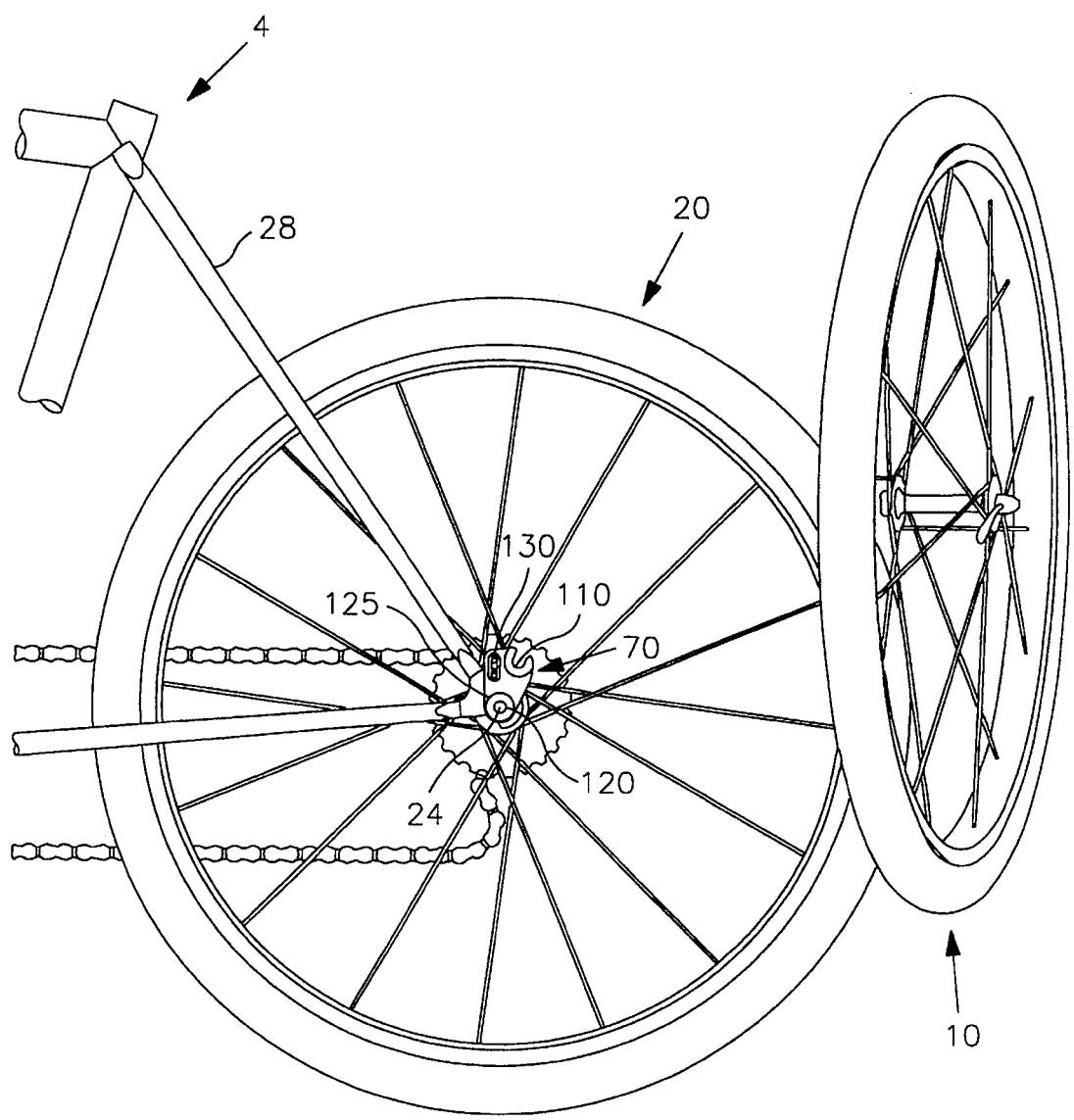
FIG. 1 is a front elevational view of the preferred embodiment of the present invention, particularly showing a support bracket of the invention mounted onto a rear axle assembly of a bicycle in a preferred operable position and orientation, and shown with the rear wheel mounting nut removed, a shifting gear assembly is not shown in order to provide a clear understanding of the placement of the mounting bracket, the front wheel is shown to the right side ready to be placed onto the bracket.
Figure 2:
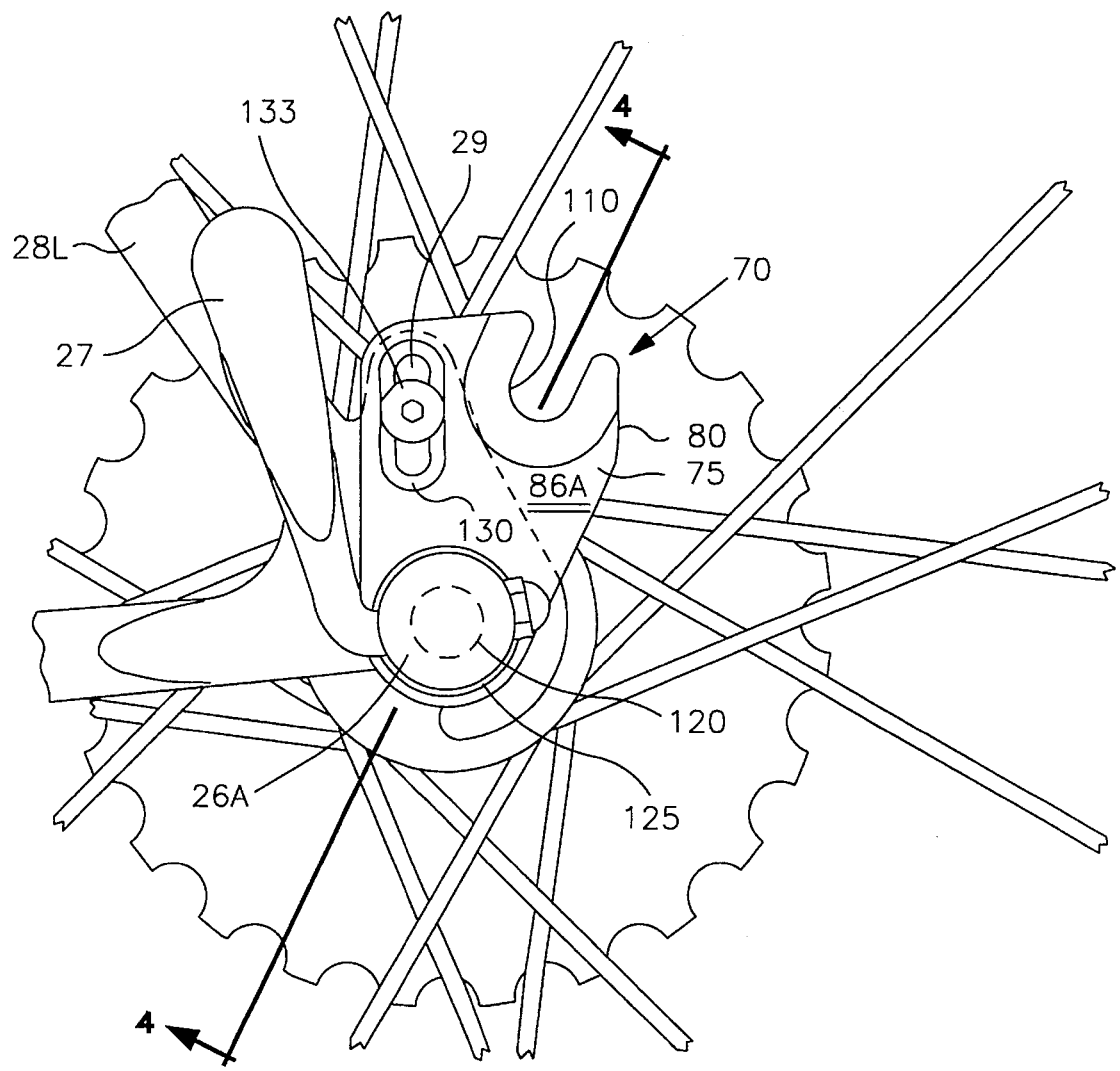
FIG. 2 is an enlarged view of a portion of FIG. 1, particularly showing the mounting bracket of the present invention with the rear wheel mounting nut in place.
Figure 5C:
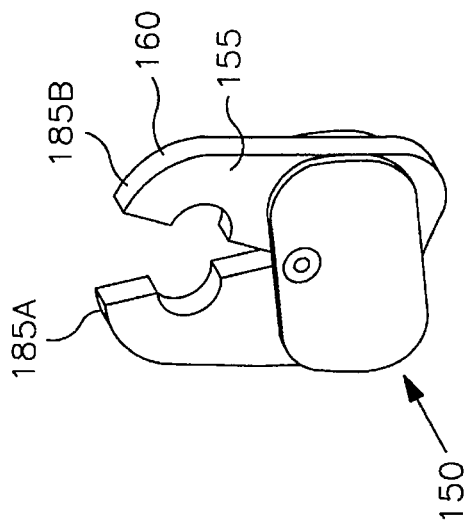
FIG. 5C is similar to FIG. 5A but showing the spacer device in an open orientation.
Figure 5B:
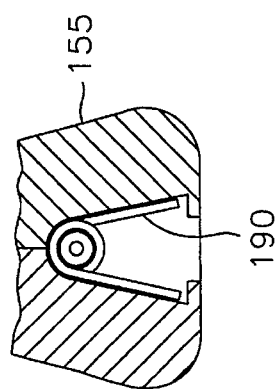
FIG. 5B is a cutaway view of the spacer device showing particularly the biasing means of the device.
Figure 5A:
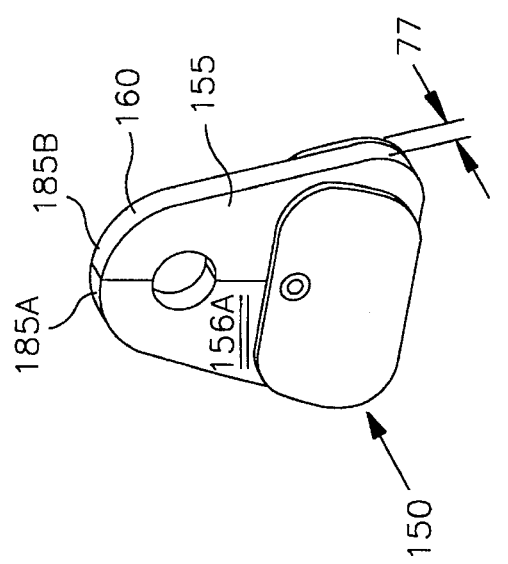
FIG. 5A is a perspective view of the spacer device of the invention.
Figure 6:
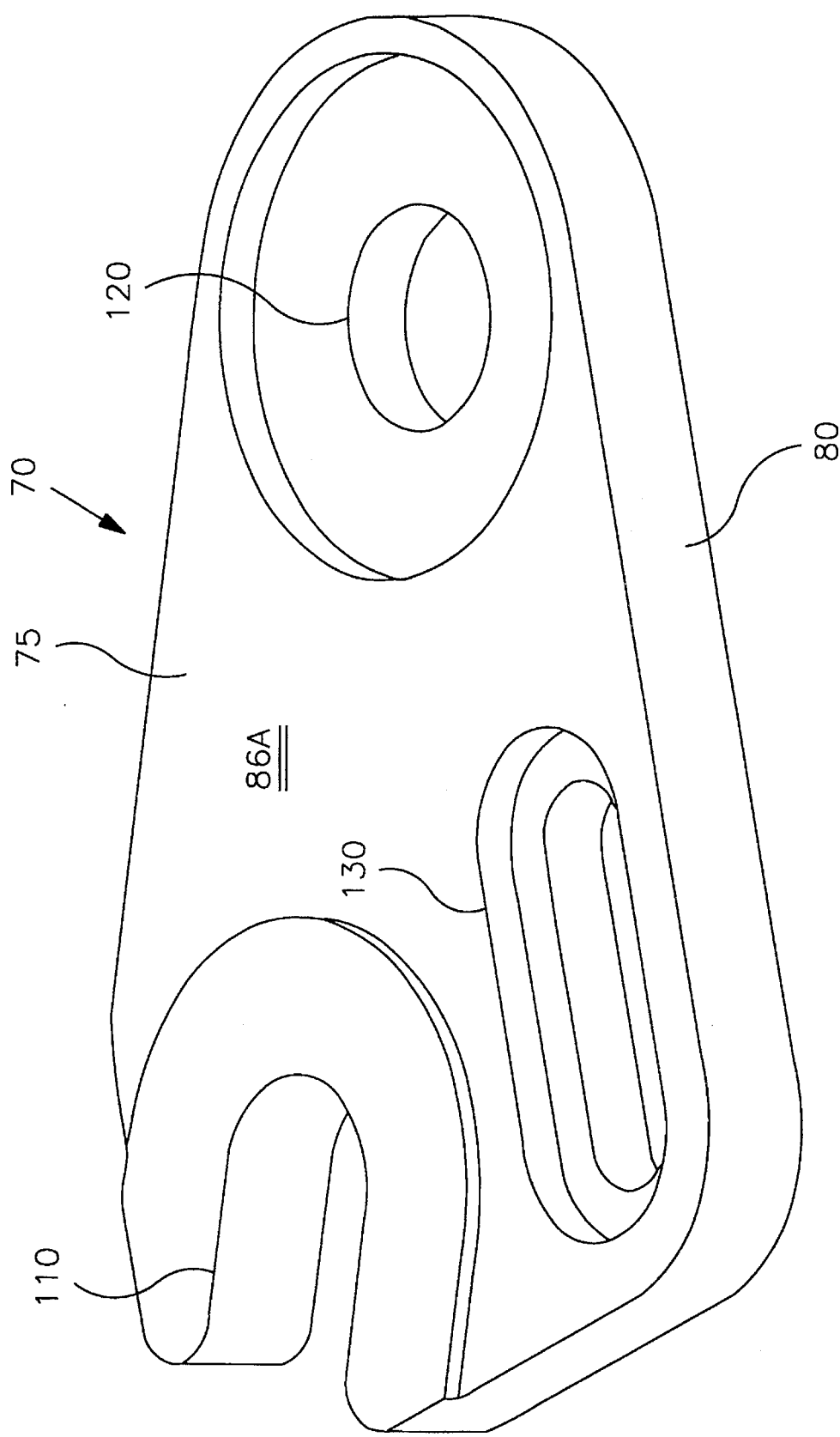
FIG. 6 is a further perspective view of the support bracket of the present invention.

FIGS. 1–6 show a preferred mode of the present invention. The invention, as best seen in FIG. 6 is a support bracket 70 designed to be secured onto a first wheel 20, as shown in FIGS. 1 and 2, so that a second wheel 10 may be mounted onto the bracket 70, thus securing the first and second wheels, 20 and 10, together in parallel, side-by-side alignment. The size and shape of the bracket 70 can be varied so as to accommodate different types of vehicle wheels.

As seen in FIGS. 1–4, the instant invention is particularly designed for use in mounting bicycle wheels. The invention is most beneficial for providing an easy means to transport a from bicycle wheel during transport of the bicycle itself. Since many types of bicycle carriers require that the front wheel be removed to properly secure the bicycle to the carrier, the present invention saves space,by providing a convenient means to easily and securely store the removed front wheel during transport. Thus, the following description details the invention as used for mounting the front wheel 10 of a bicycle 4 to a rear wheel 20. Below, the first wheel 20 will be referred as the rear wheel, and the second wheel 10 will be referred to as the front wheel. However, the invention is by no means limited to this use, as the bracket 70 can be used with any type of vehicle to mount the front wheel 10 to the rear wheel 20, the rear wheel 20 to the front wheel 10, or a spare wheel to the front 10 or to the rear wheel 20. The most probable use of the mounting bracket will be to store a front wheel 10 at the side of a rear wheel 20 during transport of the bicycle, so this application will be describer below.

The support bracket 70 is easy to mount onto the bicycle 4, and it is of a size and shape that allows it to remain permanently mounted to the bicycle 4 without inhibiting the movement or operation of the bicycle 4. In fact, in another embodiment, the bracket 70 is constructed as an integral part of the frame of the bicycle 4. Both embodiments allow the wheel mounting process to be accomplished very quickly without any special equipment, strength or special know-how.

As best seen in FIGS. 2 and 6, the support bracket 70 has a rigid body 75 with a peripheral edge 80 that defines the extent of a pair of opposing, spaced apart, front and back side surfaces, 86A and 86B (FIG. 4) respectively which define a body thickness between them. The peripheral edge 80 preferably has a streamlined, nearly triangular shape so that the support bracket 70 is as small and compact as possible, thereby allowing the rear wheel 20 and its drive components to have free movement when the support bracket 70 is mounted. The support bracket 70 has an elongate mounting slot 110, a round mounting hole 120 and an elongate positioning slot 130 that fully extend through the part. The mounting hole 120 preferably has a counterbore 125 from the front side surface 86A, and the positioning slot 130 is preferably counterbored as well. As illustrated in FIG. 2, from the front side surface 86A the support bracket 70 is preferably configured so that the positioning slot 130 is above the mounting hole 120 and to the left of the mounting slot 110. This allows for ample clearance space for mounting front wheel 10.

Figure 4:
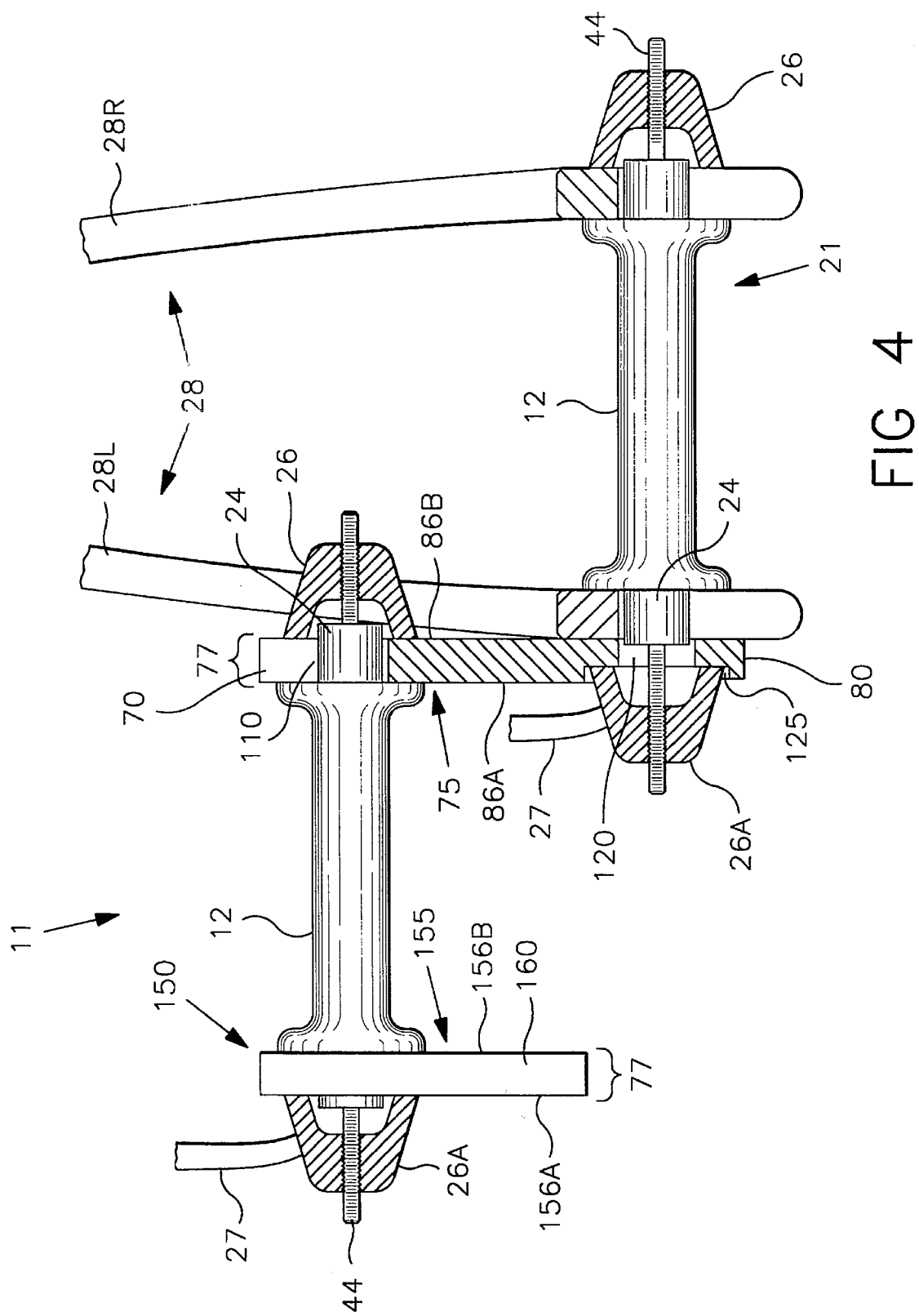
FIG. 4 is a cross-sectional view taken along line 4—4 in FIG. 2 more specifically showing the relative positions of the tightening bolts, tightening nuts, wheel axles, wheel hubs, and wheel mounting forks of a typical bicycle as well as the support bracket and the spacer of the invention. Specifically not shown are the wheel spokes and bearing sets of the wheels and other bicycle details for the sake of clarity in the drawing.

In order to best understand the mounting procedure used in mounting the support bracket 70 to the bicycle 4, as well as the procedure for mounting the front wheel 10 to the rear wheel axle assembly 21, we will first describe the hardware of a typical bicycle axle assembly currently in very wide use due to its ability to quickly engage and disengage the wheel from the bicycle. Both the front and rear axle assemblies, 11 and 21 respectively, are best shown in FIG. 4. Please note that both the front and rear wheel axle assemblies 11 and 21 include a hub 12 within which is located bearing sets (not shown), and an axle 24, which extends through the hubs 12. Tightening bolt 44, extends through the axle 24, with tightening nut 26 typically positioned on the right side of the bolt 44 while tightening nut 26A with clamping lever 27, is generally located on the left side of the bolt 44. Again, with reference to the front and rear wheel axle assemblies 11 and 21, the nuts 26 and 26A normally compress, from opposing sides, a fork 28 against the hub 12 for tightening the wheels 10 and 20 onto the bicycle 4. Please note that the fork 28 sits upon the axle 24 on both sides of the hub 12. Please note also, that the fork 28 is comprised of a right and left fork halves, 28R and 28L. Although the fork 28 of the front wheel 10 is not shown in the drawings, it also is compressed against the hub 12 of front wheel 10, and consists of a right and left fork halves. It will not be described here in detail, but, the nut 26A with clamping lever 27 is a common item of hardware extensively used with bicycle wheel mountings. The lever 27 moves a pall within the nut 26A which cinches the nut to a final tightness so that a wrench is not necessary.

To mount the support bracket 70 to the rear wheel axle assembly 21, as shown in FIG. 4, the wheel tightening nut 26A is removed from the tightening bolt 44, and the support bracket's mounting hole 120 is engaged over the tightening bolt 44, front side surface 86A facing outwardly, until the back side surface 86B of the support bracket 70 contacts the left fork half 28L. The tightening nut 26A is then replaced on the tightening bolt 44, and the clamping lever 27 is easily grasped and hand-rotated until the support bracket 70 is sandwiched compressively between the left fork half 28L and the nut 26A. In this position, as shown in FIG. 4, the nut 26A is engaged in the counterbore 125 of the mounting hole 120, which prevents the bracket 70 from moving, except it is remotely possible that it could rotate around the tightening bolt 44. In most bicycles, as illustrated in FIG. 4, the axle 24 does not extend beyond either fork half 28R and 28L, so that the mounting hole 120 is engaged over the tightening bolt 44 only, with the nut 26A and counterbore 125 engagement preventing the bracket 70 from contacting the bolt 44. However, the diameter of the mounting hole 120 is large enough to accept the rear axle 24 through it, so as to accommodate those bicycles in which the axle 24 extends beyond the fork halves 28R and 28L.

Preferably, the positioning slot 130 (FIG. 2) is used to secure the support bracket 70 to the bicycle 4 so that the mounting bracket 70 cannot rotate around the tightening bolt 44. To do this, the support bracket 70, before being tightened, is rotated until the mounting slot 110 is angled upwardly, and the positioning slot 130 is aligned with a threaded mounting hole 29 in the left fork half 28L. A fastener 133, preferably a machine screw, is engaged through the positioning slot 130 and then engaged with the mounting hole 29, thereby tightening the support bracket 70 to the mounting fork 28 at the fork mounting hole 29. The elongate shape of the positioning slot 130 allows the support bracket 70 to be fastened to a range of bicycles which have fork mounting hole 29 in differing positions.

Figure 3:
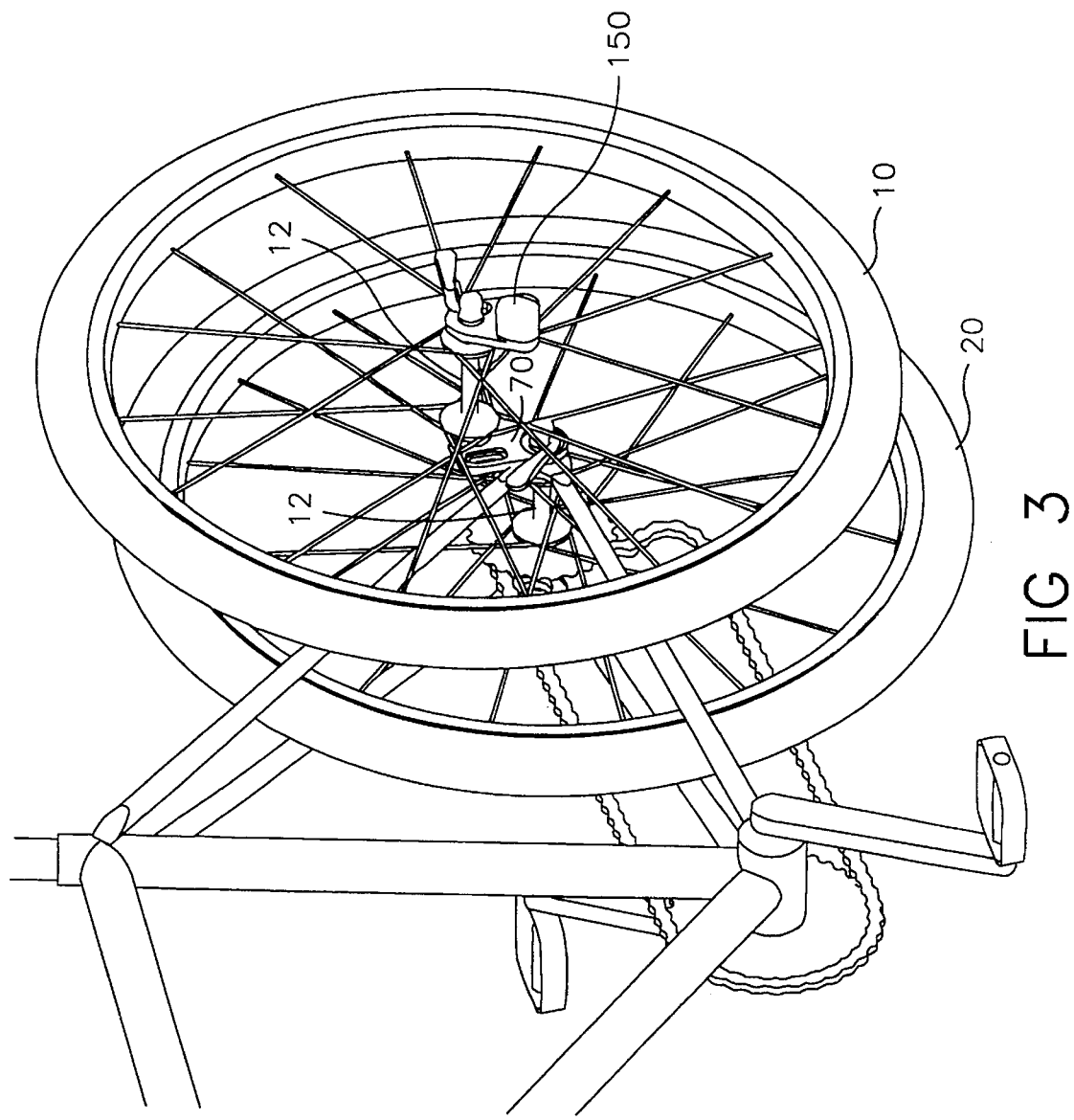
FIG. 3 is a perspective view of the invention of FIG. 1, particularly showing the rear portion of the bicycle and the manner of mounting a front wheel axle into the support bracket for storage of the from wheel in a position adjacent to the rear wheel and also showing a spacer device used in combination with the mounting bracket.

Once the support bracket 70 is secured onto the rear wheel axle assembly 21, the front wheel 10 can be mounted onto it. The mounting slot 110 of the support bracket 70 is open to the peripheral edge 80 and extends inwardly from the peripheral edge 80 into the body 75. It is sized and positioned so that with the support bracket 70 properly mounted, an axle 24 of the from wheel 10 can be slid into the mounting slot 110 from above. Note that the body thickness 77 of the bracket 70 is approximately equal to that of the front wheel's right fork half (not shown), so that the spacing between the nut 26 and the hub 12 of the from wheel 10 requires minimal adjustment in order to fit wheel 10 onto bracket 70. Front wheel assembly nut 26A could be tightened at this point in order to hold front wheel 10 on mounting bracket 70, however it is preferable to insert spacer device 150 with body thickness 77 on the left side of front wheel assembly 11 as shown in FIG. 4. Spacer device 150 takes-up space on the front wheel axle assembly equal to the width of the front wheel's left fork half (not shown), so that spacing between the nut 26A and the hub 12 of the front wheel 10, again, requires minimal adjustment in order to tightly mount front wheel 10 onto mounting bracket 70. Clamping lever 27 of front wheel mounting nut 26A is then rotated, tightening the front wheel axle assembly 11 to the support bracket 70, so that the front and back wheels, 10 and 20 respectively, are mounted in parallel, side-by-side alignment, as best seen in FIG. 3.

The use of the spacer 150 greatly speeds thee tightening process. Without the spacer 150, the front wheel tightening nut 26A must be rotated numerous times before the desired tightness is achieved. However, with the spacer 150 in place, the tightening process is completed with little adjustment of nuts 26 and 26A.

There are several possible embodiments of the spacer 150. In one embodiment, as shown in FIG. 5A, the spacer 150 is similar in form to the support bracket 70. It has a rigid body 155 with a peripheral edge 160 of nearly triangular shape, defining the extent of a pair of spaced apart, opposing side surfaces 156A and 156B. The side surfaces 156A and 156B define a body thickness 77 that is approximately equal to the width of the left fork half 28L. In this embodiment, the spacer 150 is composed of a first and second portions 185A and 185B that are held together in a closed position (FIG. 5A) by a biasing means 190, preferably a spring, as seen in FIG. 5B. The biasing means 190 allows the two portions 185A and 185B to be pivotally moved to an open position, as shown in FIG. 5C for laterally engaging the front wheel axle 24 as shown in FIG. 3.

In an alternate embodiment, the spacer 150 could be a simple U-shaped washer (not shown) of appropriate body thickness 77, which would be inserted onto the front wheel axle as a simple spacer. It would be held in place by compression force by tightening nuts 26 and 26A.

While the invention has been described with reference to a preferred embodiment, it is to be clearly understood by those skilled in the art that the invention is not limited thereto. For example, while the above description details mounting a second wheel 10 onto the left side of a first wheel 20, the second wheel 10 could equally be mounted to the right side of the first wheel 20. Thus, the scope of the invention is to be interpreted only in conjunction with the appended claims.

What is claimed is:

1. A support bracket for mounting on a first axle assembly of a first wheel, the support bracket comprising a rigid body providing a peripheral edge defining the extent of a pair of opposing, spaced apart, side surfaces, each surface situated in opposing parallel planes defining a body thickness therebetween, and further providing an elongate mounting slot open to the peripheral edge and extending into the body therefrom, and a round mounting hole including a counterbore from one of the side surfaces, the slot and hole extending through the body between the side surfaces, each providing clearance therethrough, the slot sized and oriented such that with the mounting hole operably engaged with the first axle assembly, the mounting slot is positioned for receiving an axle of a second axle assembly of a second wheel, for supporting the second wheel lateral to the first wheel.

2. The support bracket of claim 1 wherein the body thickness is approximately equal to the width of a wheel mounting fork half of a bicycle.

3. The support bracket of claim 2 further including an elongate positioning slot extending between the side surfaces and positioned such that with the support bracket operably mounted, the positioning slot is aligned with a mounting hole in a wheel mounting fork and sized for accepting a fastener therein for tightening the support bracket to the mounting fork at the fork mounting hole thereby preventing rotation of the bracket on the first axle assembly.

4. In a bicycle, a combination including a support bracket for mounting on a rear axle wheel tightening bolt between a wheel mounting fork and a wheel tightening nut, the support bracket comprising a rigid body providing a peripheral edge defining the extent of a pair of opposing, spaced apart, side surfaces, each surface situated in opposing parallel planes defining a body thickness therebetween, and further providing an elongate mounting slot open to the peripheral edge and extending into the body therefrom, and a round mounting hole including a counterbore from one of the side surfaces, the slot and hole extending through the body between the side surfaces and each providing clearance therethrough, the slot sized and oriented such that with the support bracket operably mounted, sandwiched compressively between the wheel mounting fork and the wheel tightening nut, the nut engaged in the counterbore, the wheel tightening bolt passing through the hole, a second wheel axle is engagable into the slot from above whereby the second wheel may be tightened onto the support bracket for storage thereon, the combination further including a spacer being mounted in an opposing position on the second wheel axle for taking up mounting fork space.

5. The combination of claim 4 wherein the body thickness of the support bracket and the thickness of the spacer are each approximately equal to the width of one of the wheel mounting fork halves.

6. The combination of claim 4 wherein the spacer includes first and second portions pivotally biased into a closed position and pivotally movable to an open position for laterally engaging the second wheel axle.

7. The combination of claim 4 further including an elongate positioning slot extending between the side surfaces of the support bracket and positioned such that with the support bracket operably mounted, the positioning slot is aligned with a mounting hole in the wheel mounting fork and sized for accepting a fastener therein for tightening the support bracket to the mounting fork at the fork mounting hole.

8. The combination of claim 7 wherein the body thickness of the support bracket and the thickness of the spacer are each approximately equal to the width of one of the wheel mounting fork halves.

9. The combination of claim 7 wherein the spacer includes first and second portions pivotally biased into a closed position and pivotally movable to an open position for laterally engaging the second wheel axle.

* * * * *